UNITED STATES PATENT OFFICE.

PAUL E. GONON, OF NEW YORK, N. Y., ASSIGNOR TO ATHANASE H. GOUGET, OF SAME PLACE.

COMPOSITION OF MATTER FOR MOLDINGS.

SPECIFICATION forming part of Letters Patent No. 414,209, dated November 5, 1889.

Application filed March 26, 1889. Serial No. 304,891. (No specimens.)

*To all whom it may concern:*

Be it known that I, PAUL E. GONON, of New York, in the county and State of New York, have invented a new and useful Composition of Matter for Moldings, to be used as an imitation of metal, and which can be molded in a plastic state into any desired form, of which the following is a full, clear, and exact specification.

The composition consists of fibrous or cellular material, an adhesive material composed of glue and starch, soapstone, and bronze-powders.

To carry my invention into effect, I mix a fibrous or cellular material—such as wood pulp—with bronze-powders, so as to impart a uniform color of any desired shade to the wood pulp. The wood pulp is in a nearly dry state before it is mixed with the bronze-powders, and after mixing the entire mass is dried sufficiently to be powdered by suitable machinery and mixed with about one-third soapstone or its equivalent, and with this mass is mixed a binding substance of considerable adhesive strength, such as a mixture consisting of one-third of glue dissolved in two-thirds of starch boiled in water, these two parts being boiled for a few minutes before being mixed with the mass above described. About twenty to thirty grains of the binding substance—glue and starch—is used for every five hundred grains of the pulp and bronze-powders, according to the specific gravity of the pulp. The quantity of this gelatinous substance must be sufficient to form a paste or dough of the mass, which, in a semi-fluid or plastic state, can be shaped in molds and left to dry The dried substance is an imitation of bronze, and its density can be increased or diminished by adding more or less of the binding substance—soapstone, glue, and starch.

The substance, if not formed into ornamental articles, as above described, can be carved in the same way that wood is carved. It is to be understood that the mass may be fashioned into articles without artificial heat or mechanical pressure—as, for instance, after having been applied to a wall. The adhesive materials, when combined, allow of the composition being fashioned or worked into any shape or design, the consistency of the compound enabling this to be done, and when dried without artificial heat it assumes a very hard form, and the hardening is aided by the soapstone, which also fills the fibrous material and gives the article a hard and smooth appearance.

The above-described substance can be made fire-proof by adding to the bronze-powders metallic salts—such as salts of copper, alum, &c.—and if exposed to heat the salts produce a fire-extinguishing fume.

The surfaces of the articles molded from this substance can be electroplated in the usual manner.

Having thus fully described my invention, I claim as new and desire to secure by Letters Patent—

The herein-described composition of matter, consisting of fibrous or cellular material, soapstone, strong adhesive material composed of glue and starch and bronze-powders, all combined substantially in the proportions specified.

PAUL E. GONON.

Witnesses:
   THEO. G. HOSTER,
   EDGAR TATE.